UNITED STATES PATENT OFFICE.

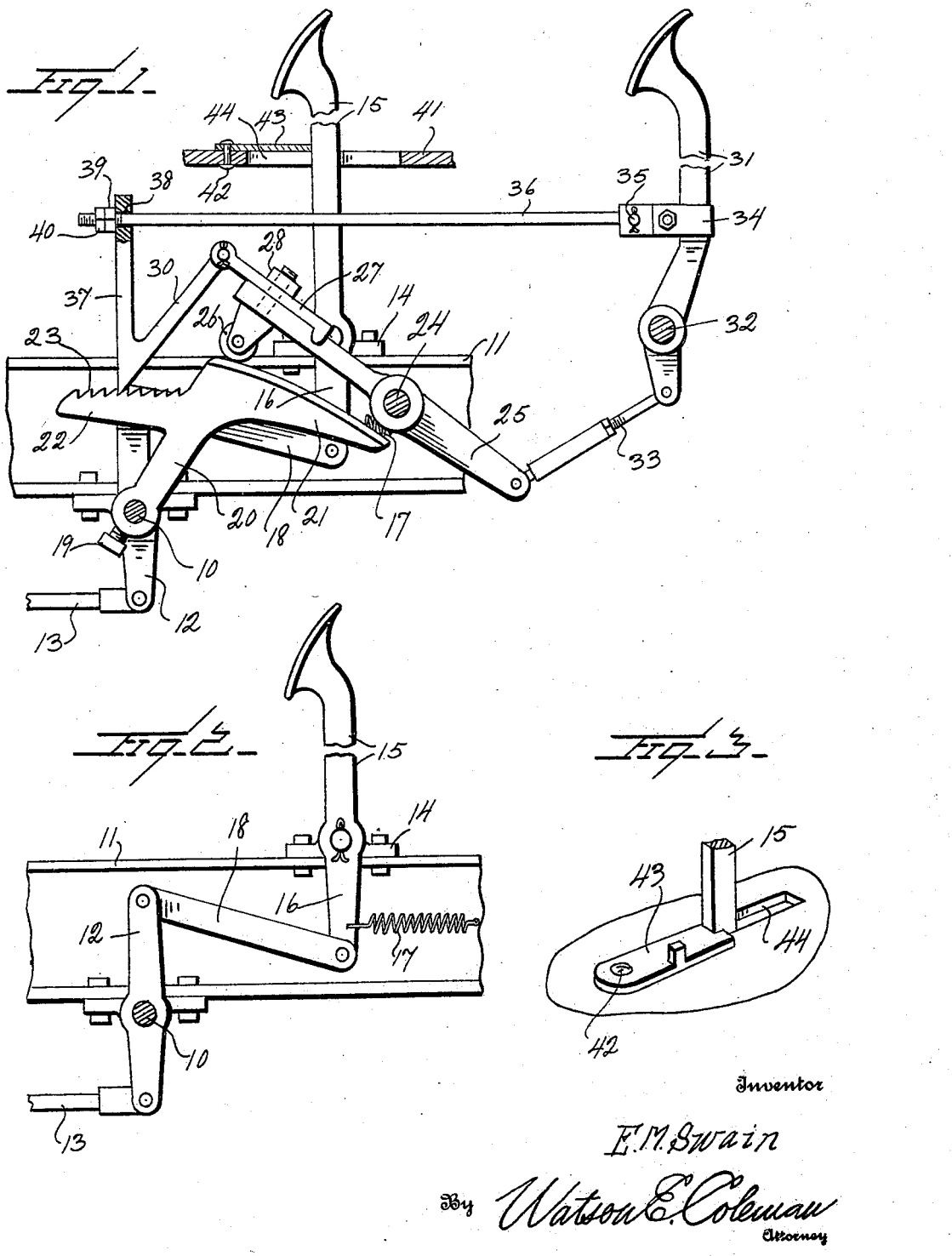

ERWIN M. SWAIN, OF PLYMOUTH, CALIFORNIA.

TRANSMISSION CONTROL.

1,413,301.  Specification of Letters Patent.  Patented Apr. 18, 1922.

Application filed July 28, 1920. Serial No. 399,475.

*To all whom it may concern:*

Be it known that I, ERWIN M. SWAIN, a citizen of the United States, residing at Plymouth, in the county of Amador and State of California, have invented certain new and useful Improvements in Transmission Controls, of which the following is a specification, reference being had to the accompanying drawings.

This invention relates to improvements in transmission controls and more particularly to an improvement in that type of transmission control in which a single pedal is used to control the forward speeds and neutral positioning of the transmission mechanism.

An important object of the invention is to provide a control for a transmission of the type described which is particularly well exemplified by the transmission at present utilized in the Ford automobile, means whereby the retaining of the transmission gearing in the neutral position is simplified.

A further object of the invention is to provide in a device of this character, means whereby the pedal control and the speeds may be locked in any desired position.

A further object of the invention is to provide in a construction approximating that of the transmission and controls at present used in the Ford automobile, means whereby the emergency brake, and control lever positioning cam, may be positioned and operated through the medium of the foot lever.

Further objects and advantages of the invention will become apparent throughout the course of the following description.

In the accompanying drawings, wherein for the purpose of illustration is shown a preferred embodiment of my invention and wherein like reference characters designate like parts throughout:

Figure 1 is a side elevation partly in section of a transmission control constructed in accordance with my invention.

Figure 2 is a side elevation of the speed lever and brake control detached; and

Figure 3 is a perspective view showing the brake and speed lever control pedal stop.

Referring now more particularly to the drawings, the numeral 10 indicates the usual control shaft employed in the Ford automobile, this shaft being rotatably mounted in the side frames 11 of the automobile. To this shaft at one end thereof is secured a transversely extending lever 12, the lever being mounted intermediate its ends upon the shaft and being held against rotation with relation thereto. To the lower end of this lever is pivoted the forward end of the link 13 which has its rear end secured to the usual expansible brake band (not shown). Pivoted upon the side frame of the automobile in the position usually accommodating the pivotal control lever of the Ford automobile (not shown), in bearings 14 secured to the side frames 11, is a foot pedal 15, the pedal being mounted in the bearings 14 intermediate its ends, and positioned to oscillate in a plane extending longitudinally of the automobile. To the lower end 16 of the foot pedal 15 is secured a spring 17 which constantly urges the pedal rearwardly. This lower end 16 is connected with the upper end of the lever 12 by means of a link 18.

It will be observed that if the foot pedal 15 moves forwardly that the upper end of the lever 12 is moved rearwardly and the shaft 10 is oscillated in a counter-clockwise direction. This causes forward movement of the link 13 which movement serves to apply the brake.

The shaft 10 has secured, as at 19, and held against rotation with relation thereto, a combined member 20, providing the usual speed lever cam 21 and a rearwardly extending portion 22 provided upon its upper face with a rack 23.

The numeral 24 designates the usual clutch lever shaft of the Ford transmission which when rotated in a clockwise direction disengages the sections of the clutch. This shaft has mounted thereon the usual clutch lever 25 provided at its rear end with an adjustable roller 26 which engages the upper cam face 21 of the member 20. To this end of the lever is secured a member 27 preferably comprising a bar extending longitudinally of the speed lever and held in position thereon by means of the adjustable roller 26 which provides a threaded portion receiving a nut 28 for this purpose and for the further purpose of securing the roller in adjusted position. To this plate 27 is pivotally secured by means of a loose pin cotter key, in order that it may be readily removed, a pawl 30.

The numeral 31 designates the clutch pedal of the Ford transmission which is, as is well known to those familiar with the art, rotatably mounted upon and secured to the slow speed shaft of the transmission. This pedal is adapted, if moved forwardly a sufficient distance, to rotate the shaft and shift the same longitudinally, tightening a band which brings into action the low speed gears of the transmission. As these parts form no part of my invention and are not claimed by me, I have not illustrated the same.

As clearly shown the pedal 31 is mounted upon the shaft 32 at a point intermediate its ends and the pedal has secured to its lower end an adjustable link 33 by means of which it is connected to the forward end of the clutch lever 25. It will be seen that when the pedal 31 is moved forwardly the forward end of the clutch lever 25 is moved downwardly and rearwardly, causing the lever 24 to rotate in a clockwise direction disengaging the clutch. When the lever is in its rearmost position the clutch sections are disengaged.

About the pedal 31 above the point at which it is secured to the low speed shaft, is secured a clamp 34 of any preferred construction having pivotally mounted thereon as at 35 one end of a link 36. The pawl 30 embodies an upstanding arm 37 having formed therein an opening 38. The rear end of the link 36 is threaded and extends slidably through the opening 38 and is provided upon its rear end with an adjusting nut 39 and a lock nut 40. An inspection of the drawings will reveal the fact that forward movement of the foot pedal 31 will release the pawl 30 from the ratchet teeth 23 through the medium of the link 36.

The operation of my device is as follows: As is well known to those familiar with the art, when the speed lever of the usual Ford construction is in the neutral position, the foot pedal 31 may be moved forwardly to bring into action the low speed gear. The action in my construction is similar. Assuming the brakes to be set by the pedal 15, in which instance the pedal is moved forwardly to its extreme forward position and the pawl 30 engaged in the ratchet teeth 23 at a point next adjacent the heel of the cam of the speed lever 20. If it is desired to release the pedal 15 for rearward movement to place the speed lever in such a position that the clutch of the transmission may not be brought into engagement, or in that position commonly designated as the neutral position, this may be done by moving the foot pedal 31 forwardly a short distance, thereby releasing the pawl 30 from the teeth 23, permitting the spring 17 to move the pedal 15 rearwardly. In order to assist in positioning the pedal 15 I prefer to pivotally connect to the foot boards 41 of the automobile, as at 42, a member 43 which may be positioned transversely of the slot 44 in which the pedal 15 operates by means of the foot. This member is so positioned that when the pedal 15 engages the same during rearward movement the speed lever 20 is so positioned as to hold the clutch lever in the position in which the clutch is in neutral. It will be obvious that in traveling through congested traffic where the traveling is entirely in low or neutral and upon grades where the operator desires to maintain the device in neutral, and likewise in rough traveling where the traveling is made in low and neutral, a device of the character just described is of great advantage in that it eliminates the necessity of the operator keeping his foot upon the foot pedal 31 to position the same. This foot pedal construction, when associated with the stop member just described, corresponds in action to the present Ford emergency brake lever, by means of which in the present construction the speed lever is controlled and the brake operated, but has the advantage, thereover, that it is unnecessary for the operator to lean forwardly and grasp the same in order to bring the speed lever to the neutral position but to set the brake. If it is desired to release the pedal for complete rearward movement, which movement places the clutch in engagement and engages the portions of transmission for traveling in what is commonly known as high, the member 43 may be shifted out of the way and the foot pedal 15 released by a slight kick or forward movement upon the foot pedal 31 which releases the dog and permits the spring 17 to exercise its effect upon the pedal 15.

It will be obvious from the foregoing description that my device is possessed of many advantages not possessed by the present construction without any material change therein, and that such application involves no change whatsoever in the construction of the transmission proper. It will likewise be obvious that the construction hereinbefore set forth is susceptible of some change in the specific structure thereof and I accordingly do not limit myself to such specific construction but may make any such changes without departing from the spirit of the invention or the scope of the subjoined claims.

Having now described my invention, what I claim is:

1. In a transmission control, a pivoted lever, a rock shaft, a member carried by the shaft and adapted to oscillate when the shaft is rocked, said member being adapted to variably limit the movement of said lever in one direction, automatic means operatively connected with said shaft to shift said shaft and member in one direction and locking means connected with said lever and engaging said member to normally prevent movement of said member in the said direction.

2. In a transmission control a pivoted lever, a rock shaft, a member carried by the shaft and adapted to oscillate when the shaft is rocked, said member being adapted to variably limit the movement of said lever in one direction, automatic means operatively connected with said shaft to shift said shaft and member in one direction, locking means connected with said lever and engaging said member to normally prevent movement of said member in the said direction, a pivoted member adapted when shifted to shift said lever and means connecting said pivoted member and said locking means whereby said locking means is disengaged from said member to permit movement thereof in said direction when the pivoted member is shifted in one direction.

3. In a transmission control, a rock shaft, a pedal operatively connected with the shaft to rock the same, a spring to move the pedal in one direction, a pivoted lever, a pedal for shifting said lever, locking means operatively connecting said lever and said shaft to lock the first named pedal against movement under influence of said spring, and means connecting said locking means and said second named pedal whereby said locking means is released upon movement of said second named pedal in one direction.

4. In a transmission control, a pivoted lever, a rock shaft, means for shifting said rock shaft in one direction, a speed lever carried by the rock shaft to oscillate when the shaft is rocked and adapted to vary the movement of said lever in one direction, automatic means operatively connected with said shaft to shift said shaft and said speed lever in one direction, a ratchet secured to said speed lever and extending rearwardly therefrom, a dog pivotally connected to said pivoted lever and engaging said ratchet a pedal adapted when shifted to shift said pivoted lever and a link connecting said pedal and said dog whereby said dog is released from engagement with said ratchet upon movement of said pedal in one direction.

5. In a Ford transmission control, a brake lever, a forwardly moving foot pedal, a connection between the lever and pedal, a clutch lever, and means carried thereby for locking the brake lever and foot pedal in predetermined position.

6. In a Ford transmission control, a brake lever for operating the emergency brake, a forwardly moving foot pedal connected to said lever for operating the same, a clutch shaft and means carried in part by said shaft for locking the brake lever and pedal in predetermined position.

7. In a Ford transmission control, a brake lever for operating the emergency brake, a forwardly moving foot pedal connected to said lever for operating the same, a clutch shaft and means carried in part by said shaft for locking the brake lever and pedal in predetermined position, a low speed pedal and means operable in the use of said low speed pedal for releasing the locking means.

In testimony whereof I hereunto affix my signature.

ERWIN M. SWAIN.